J. P. DEVEREAUX.
WHEEL.
APPLICATION FILED JUNE 24, 1915.

1,176,352.

Patented Mar. 21, 1916.
2 SHEETS—SHEET 1.

WITNESSES:
Maude M. Amoss.

INVENTOR.
James P. Devereaux
BY Chapin A. Ferguson
ATTORNEY.

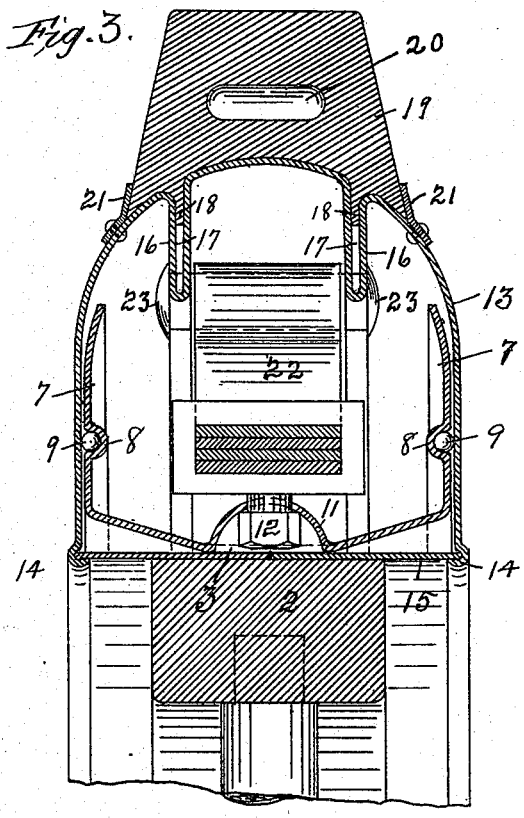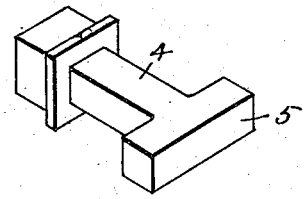

UNITED STATES PATENT OFFICE.

JAMES P. DEVEREAUX, OF BALTIMORE, MARYLAND.

WHEEL.

1,176,352.  Specification of Letters Patent. Patented Mar. 21, 1916.

Application filed June 24, 1915. Serial No. 36,016.

*To all whom it may concern:*

Be it known that I, JAMES P. DEVEREAUX, a citizen of the United States, residing at Baltimore, in the State of Maryland, have invented certain new and useful Improvements in Wheels, of which the following is a specification.

This invention relates to improvements in wheels, and has for its object to provide a wheel especially adapted for use on automobiles and motor vehicles whereby the pneumatic tires generally in use on such vehicles may be dispensed with, at the same time retaining the cushioned effect produced by the use of said pneumatic tires.

The invention consists of the novel construction and arrangement of the parts and combination of parts hereinafter more fully set forth in the following specification and pointed out in detail in the appended claims.

Figure 1:
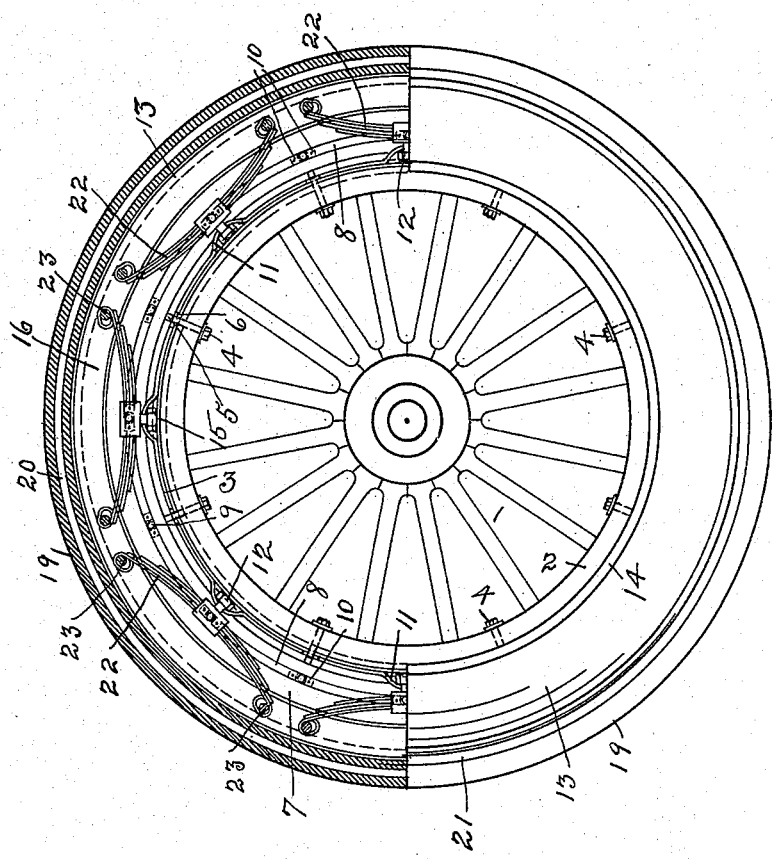
Figure 2:
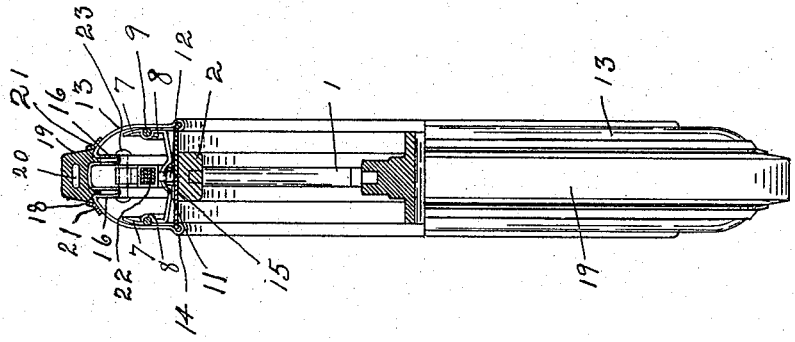

In the accompanying drawings—Figure 1 is a side elevation, partly in section, of a wheel showing my invention. Fig. 2 is an edge view of Fig. 1, partly in section. Fig. 3 is an enlarged section of a portion of the wheel taken through one of the springs. Fig. 4 is a detail perspective view of one of the bolts for holding the metal casing to the felly of the wheel.

Referring to the accompanying drawing, forming part of this specification, and in which like reference numerals designate like parts throughout the several views thereof, 1 designates a wheel having a felly 2, the said wheel being of substantially the same construction as the wheels in general use on motor vehicles. Extending entirely around the outer edge of said felly 2, is the inner shell of the metal casing which latter is provided with a flat central portion 3 and is preferably formed in two sections. The said inner shell being held to the felly 2 by the bolts 4, which latter have elongated heads 5 to permit of their being inserted through the elongated slots 6 and then turned to prevent their being pulled out. The said inner shell is formed with an annular flange 7 on each side thereof each of which is provided with an annular recess 8 in its outer face thereof into which are fitted a number of steel antifriction balls 9 each held in position by a small lug 10 on each side thereof, and which prevent friction between the inner and outer portions of the casing. The central portion 3 of the inner shell is also provided with a number of depressions 11 for the reception of the heads of the bolts 12.

The outer shell 13 of the metal casing is provided with an annular bead 14 on each of its inner edges into which fits the edges of the fabric rubber or leather piece 15 which latter is held between the felly 2 and the flat central portion 4 of the inner shell and prevents dust, dirt or water from entering the metal casing. This outer shell 13 is provided with two annular depressions forming the integral inwardly-projecting flanges 16 having the recesses 17 into which the annular flange 18 of the tire 19 projects, the latter being provided with an annular central aperture 20 to render it more resilient. The outer shell 13 is also provided with two annular flanges 21 riveted, welded or otherwise secured thereto, and between which the tire 19 fits and which serve to protect the edges of said tire. The outer shell 13 is connected to the inner shell of the casing by means of the springs 22 which latter are secured to the central portion 3 by means of the bolts 12, and have their ends projecting up between the flange 16 and secured thereto by the bolts 23 passing through the ends of said springs and through said flanges 16, thereby giving to the outer shell of the casing a yielding movement on the inner shell with respect to the axis of the wheel, the balls 9 preventing friction between the inner and outer shells of the casing, thereby giving to the wheel the cushioned effect of the pneumatic tire. The said flanges 16 not only serve as a means to which the ends of the springs 22 are secured, but greatly strengthen the outer shell.

It will thus be seen that by the construction shown and described the casing can be mounted upon the wheels in general use on motor vehicles, and that the pneumatic tires generally used on such vehicles may be dispensed with, at the same time retaining the cushioned effect produced by the use of said pneumatic tires.

Alterations and changes in the construction and arrangement of parts may be made, within the scope of the appended claims, without departing from the spirit of my present invention.

Having thus described my invention what I claim is:—

1. The combination with a wheel, of a metal casing comprising an inner shell secured to the felly of the wheel, an outer shell having two integral annular inwardly-projecting flanges, and a number of springs each being connected at its center to the inner shell and its ends projecting between and connected to the said inwardly projecting flanges.

2. The combination with a wheel, of a metal casing comprising an inner shell secured to the felly of the wheel, an outer shell having two integral inwardly-projecting flanges each having an annular recess and two annular flanges on its outer surface, a number of springs between the inner and outer shells, a tire mounted on said outer shell between said annular flanges on the outer surface thereof and having annular ribs projecting into the recesses in the said inwardly-projecting flanges.

In testimony whereof I affix my signature in presence of two witnesses.

JAMES P. DEVEREAUX.

Witnesses:
CHAPIN A. FERGUSON,
MAUDE M. AMOSS.

Copies of this patent may be obtained for five cents each, by addressing the "Commissioner of Patents, Washington, D. C."